United States Patent
Takemoto

[19]

[11] Patent Number: 6,151,136
[45] Date of Patent: Nov. 21, 2000

[54] COLOR TRANSFORMING METHOD

[75] Inventor: Fumito Takemoto, Kanagawa, Japan

[73] Assignee: Fuji Photo Film Co., Ltd., Kanagawa, Japan

[21] Appl. No.: 09/062,557

[22] Filed: Apr. 20, 1998

[30] Foreign Application Priority Data

Apr. 18, 1997 [JP] Japan .................................. 9-101880

[51] Int. Cl.[7] .............................. B41B 15/00; G03F 3/08; G06K 9/00; G06K 9/36
[52] U.S. Cl. ......................... 358/1.9; 358/518; 382/163; 382/166
[58] Field of Search ................................ 358/518, 520, 358/1.9; 382/163, 166, 167, 274, 275

[56] References Cited

U.S. PATENT DOCUMENTS

| 5,237,409 | 8/1993 | Yamaguchi | 358/133 |
| 5,239,370 | 8/1993 | Yamaguchi | 358/518 |
| 5,323,249 | 6/1994 | Liang | 358/518 |
| 5,539,540 | 7/1996 | Spaulding et al. | 358/518 |
| 5,583,666 | 12/1996 | Ellson et al. | 358/518 |
| 5,724,442 | 3/1998 | Ogatsu et al. | 382/167 |
| 5,734,745 | 3/1998 | Ohneda | 382/167 |

FOREIGN PATENT DOCUMENTS

| 61-288662 | 12/1986 | Japan | H04N 1/393 |
| 4-196675 | 7/1992 | Japan | H04N 1/40 |
| 4-196676 | 7/1992 | Japan | H04N 1/40 |
| 6-253138 | 9/1994 | Japan | H04N 1/40 |
| 6-253139 | 9/1994 | Japan | H04N 1/40 |

Primary Examiner—Kimberly A. Williams
Attorney, Agent, or Firm—Sughrue, Mion, Zinn, Macpeak & Seas, PLLC

[57] ABSTRACT

The improved color transforming method of the invention comprises the steps of: performing calorimetric conversion on the image data obtained from an input medium to produce calorimetric data on the image to be reproduced; and analyzing the resulting calorimetric data to determine automatically a format for compressing the input space of said image to the output space. The color transforming method of the invention performs analysis of the image to be reproduced so that only the areas of the image that need be subjected to compression of a color gamut can be compressed, and thereby achieves optimal color gamut compression in an image-dependent manner with minimum sacrifice in the fidelity of calorimetric reproduction.

8 Claims, 5 Drawing Sheets

FIG. 2
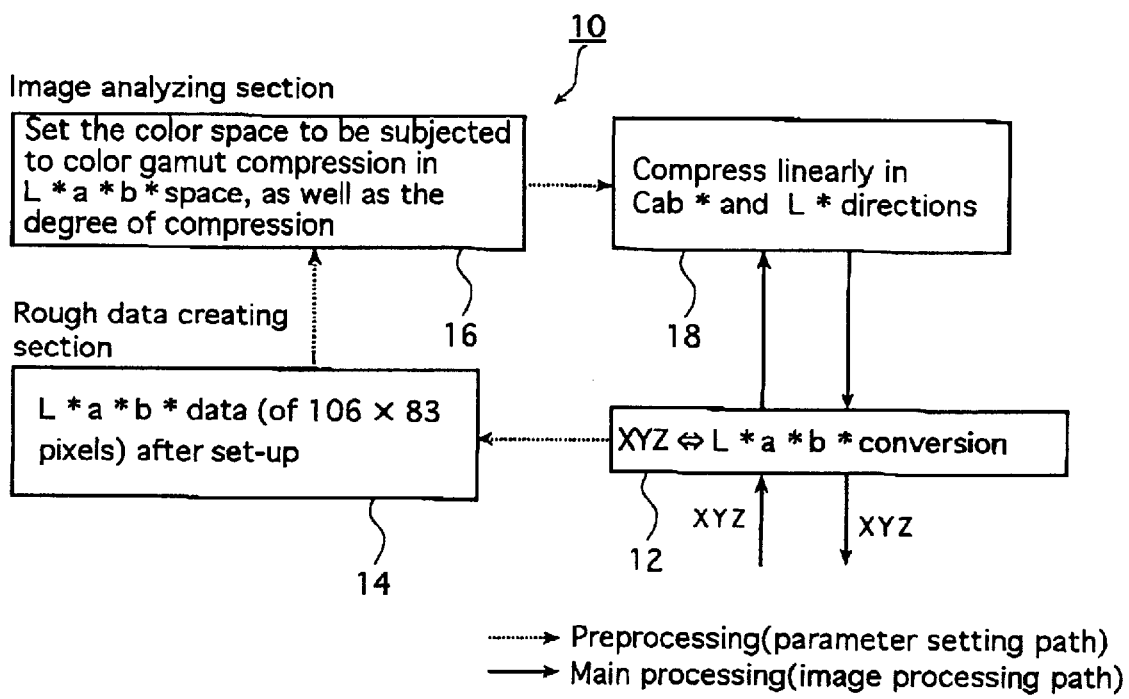
→ Preprocessing(parameter setting path)
→ Main processing(image processing path)
FIG. 3
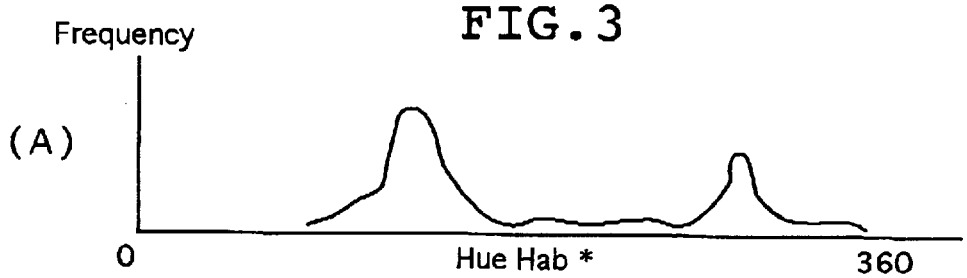
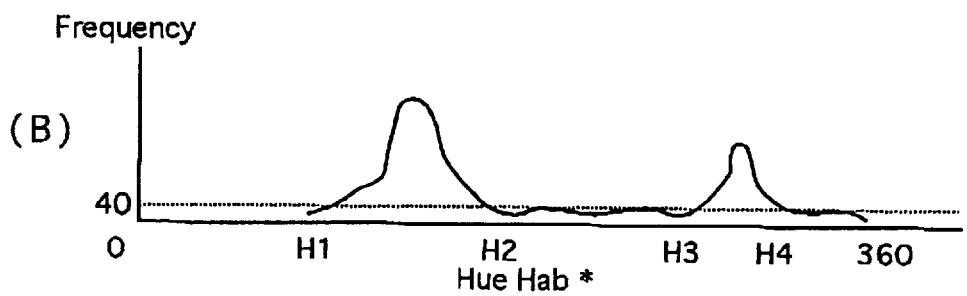

FIG. 6
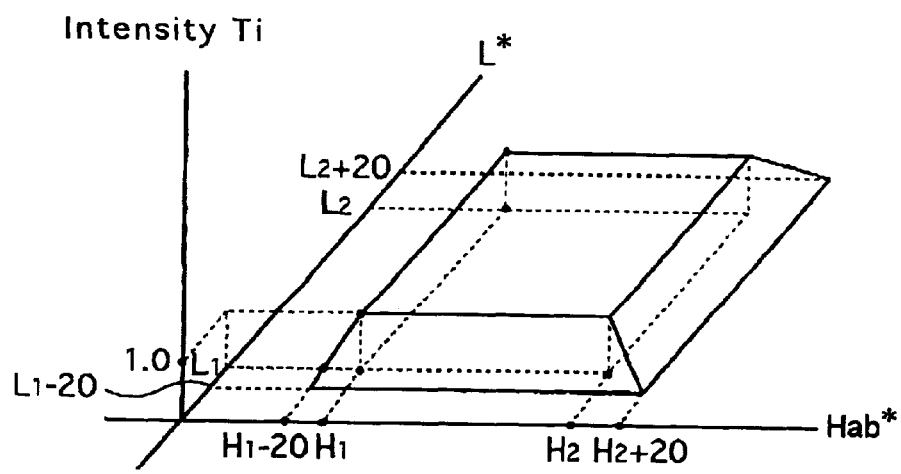
FIG. 7
(A) 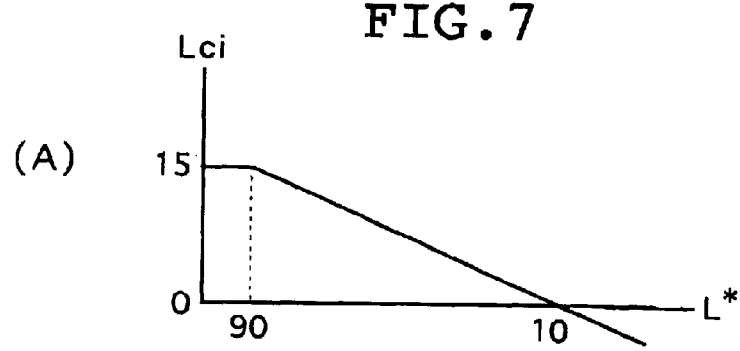
(B) 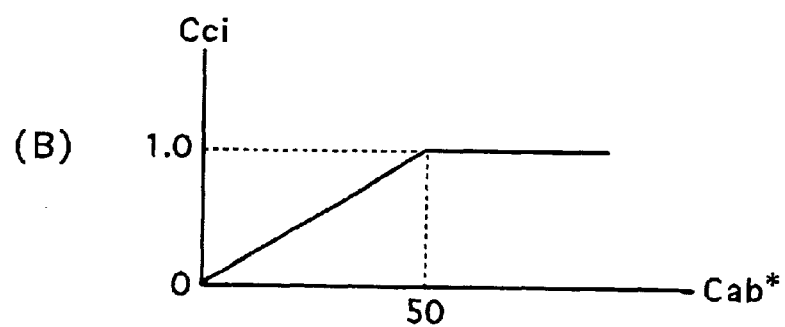

COLOR TRANSFORMING METHOD

BACKGROUND OF THE INVENTION

This invention relates to a color transforming method which uses a color gamut compressing technology in converting the color information in an input color space to that in an output color space.

In the conventional closed color processing system using a monolithic input/output device which does not take color management into account, the dynamic range of the signals from the input device have one-to-one correspondence to that of the signals from the output device. This means that the closed color processing system which gives no consideration to color management is capable of spontaneous compression of a color gamut to be reproduced but unable to perform its control.

In a color management system which converts the input signal to a colorimetric signal such as XYZ or L*a*b* before conversion to the output signal, the range of color reproduction has to be taken into account for both input and output sides but, on the other hand, the compression of the color gamut to be reproduced can be controlled. Take, for example, the color processing system shown in FIG. 9; the values of input device dependent data such as RGB that are supplied from the input device are subjected to conversion at the input end so that they are converted to calorimetric data such as L*a*b* which, in turn, is subjected to conversion at the output end so that it is converted to the values of output device dependent data such as CMY before they are delivered to the appropriate output device. The intermediary colorimetric data L*a*b* offers the advantage that the color gamut at the input end can be adjusted to the output color gamut through color gamut compression.

To exploit this advantage of the color gamut compressing technology, various methods have so far been proposed. Por example, Unexamined Published Japanese Patent Application (Kokai) Nos. 253138/1994 and 253139/1994 disclose color gamut compressing techniques that designate different color mapping methods to different subspaces of a color space and which insure continuity between the respective subspaces. In order to insure the continuity between subspaces, these color gamut compressing techniques adopt the morphing procedure commonly employed in computer graphics.

Unexamined Published Japanese Patent Application (Kokai) Nos. 196675/1992 and 196676/1992 disclose color gamut compressing techniques in which lightness is compressed in accordance with the ratio of spread in lightness along the achromatic color axis between the ranges of color reproduction for input and output sides whereas chroma is not subjected to any conversion in the area common to the ranges of color reproduction for input and output sides but compressed in the marginal areas in accordance with the spread of chroma in the ranges of color reproduction for input and output sides.

In addition, Unexamined Published Japanese Patent Application (Kokai) No. 288662/1986 discloses a color gamut compressing technique in which both lightness and chroma are compressed uniformly with specified functions when the range of output color reproduction is narrower than the range of input color reproduction.

The color processing system shown in FIG. 9 is capable of calorimetric reproduction (as faithful as can be seen to the eye); however, if calorimetric reproduction is the only process that is performed, all the colors outside the output color gamut are lost and gradations must be created by compression. On the other hand, the fidelity of colorimetric reproduction is compromised if the color gamut to be reproduced is compressed significantly. In other words, colorimetric reproduction and the compression of a color gamut (creation of gradations in highly chromatic colors) are trade-offs.

Such being the case, the compression of a color gamut should be held to a minimum when performing color transformation for the purpose of calorimetric reproduction. However, all of the color gamut compressing techniques disclosed in the above-mentioned prior patents, the color gamut to be reproduced is compressed uniformly in a non-image-dependent manner and even the pixels in the color gamut of the output medium that need not be compressed are subjected to compression. In other words, the color space is compressed uniformly regardless of the image to be reproduced and this eventually produces not only an effective image but also a non-effective image which is impaired in the fidelity of calorimetric reproduction.

SUMMARY OF THE INVENTION

The present invention has been accomplished under these circumstances and has as an object providing a color transforming method which performs analysis of the image to be reproduced so that only the areas of the image that need be subjected to compression of a color gamut can be compressed, thereby achieving optimal color gamut compression in an image-dependent manner with minimum sacrifice in the fidelity of colorimetric reproduction.

BRIEF DESCRIPTION OF THE DRAWINGS

FIG. 2 is a block diagram showing the general layout of a color gamut compressing unit for implementing the color transforming method of the invention and an applicable flow for the unit;

FIG. 3A is a graph showing a hue Hab* histogram for the pixels outside a color gamut to be reproduced which is obtained in the image analyzing section shown in FIG. 2;

FIG. 3B is a graph showing a hue range for the pixels outside the color gamut of interest which are extracted from the hue Hab* histogram;

FIG. 6 is a graph showing an exemplary case for the magnitude of a color space subjected to the compression of a color gamut of interest as obtained by the color space compressing section shown in FIG. 2;

FIG. 7A is a graph showing an exemplary lightness-dependent function to be used in color space compression as obtained in the direction of lightness by the color space compressing section shown in FIG. 2;

FIG. 7B is a graph showing an exemplary chroma-dependent function to be used in color space compression as obtained in the direction of lightness by the color space compressing section shown in FIG. 2.

DETAILED DESCRIPTION CF THE INVENTION

The color transforming method of the invention will now be described in greater detail with reference to the preferred embodiments shown in the accompanying drawings.

Figure 1:
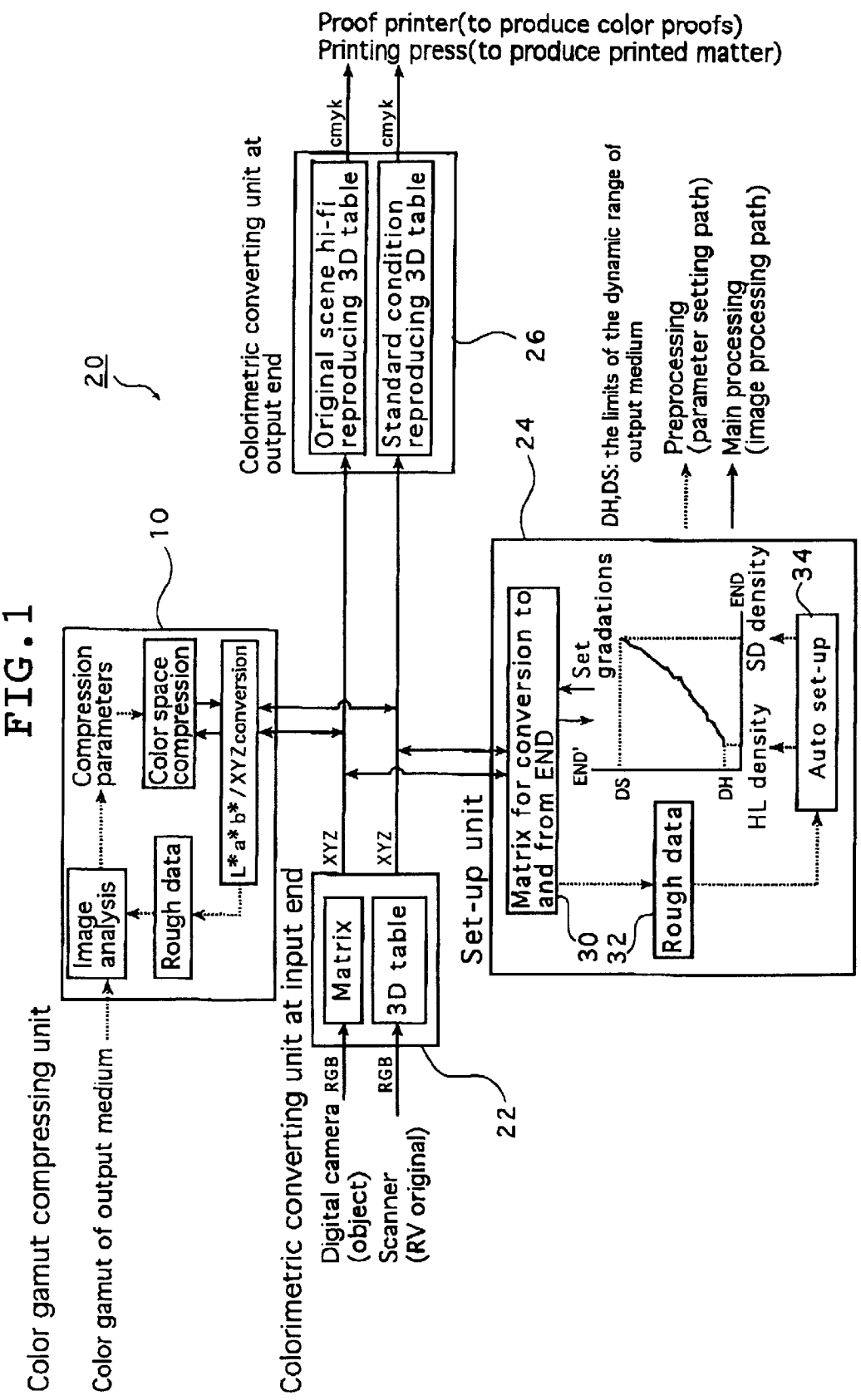
FIG. 1 is a block diagram showing the general layout of a color processing system for implementing the color transforming method of the invention.

FIG. 1 is a block diagram showing the general layout of a color processing system for implementing the color transforming method of the invention, and FIG. 2 is a block diagram showing an embodiment of the color transforming method of the invention.

The color processing (and management) system generally indicated by 20 in FIG. 1 is intended for performing the compression of a color gamut to be reproduced and other jobs of color management in such a way that device-dependent data signals from an input device are converted to calorimetric data signals, which are then processed by the color transforming method of the invention. The color processing system 20 comprises a calorimetric converting unit at the input end 22 with which the device-dependent data signals from the input device are converted to calorimetric data signals, a set-up unit 24 for performing set-up operations on the obtained calorimetric data signals, a color gamut compressing unit 10 for implementing the color transforming method of the invention, and a calorimetric converting unit at the output end 26 with which the colorimetric data signals that have been allowed to match the output color space by the compression of the color gamut of interest are converted to device-dependent data signals to be delivered from an output device. The color processing system shown in FIG. 1 is intended for use in the printing industry but this is not the sole case of the invention and any known color processing system will do as long as it is capable of performing the compression of a color gamut and other jobs of color management.

The calorimetric converting unit at the input end 22 is such that device-dependent data signals such as RGB or CMY data signals that are picked up with the input device such as a digital camera or a scanner are converted to colorimetric data signals such as XYZ data signals or L*a*b* signals under the CIE. In the illustrated colorimetric converting unit at the input end 22, RGB image data signals for an object recorded with a digital camera are converted to XYZ calorimetric data signals by a color transforming matrix, say, a 3×3 color transforming matrix; alternatively, RGB image data signals from a reversal film (RV) original that have been read photoelectrically with a scanner are converted to XYZ colorimetric data signals by a three-dimensional table, say, a color transforming look-up table (LUT).

It should be noted that the input device to be used in the invention is by no means limited to a digital camera or a scanner but they may be replaced by a TV receiver, a video camera, a TV camera, a computer for electronic creation of composite images as by CG technology, and an image creating computer for use in an electronic platemaking system. It should also be noted that the original from which RGB image data signals are to be read with a scanner is not limited to a RV original but negative film originals (negative originals) and reflection-type originals such as photographs and printed documents may be substituted. The device-dependent data signals to be picked up by the input device also are not limited to RGB or CMY data signals and any signals will do as long as they are associated with the input device to be used. The calorimetric data signals are not limited to XYZ or L*a*b* data signals and any other known calorimetric values will do. In addition, the method of converting data signals is not limited to a 3×3 color transforming matrix or a three-dimensional color transforming table and any know color transforming mapping techniques (equations and functions) may be employed, as exemplified by a 3×4 or 3×10 color transforming matrix or three one-dimensional LUTs.

The set-up unit 24 is such that gradation conditions for ensuring that the calorimetric data signals obtained by the conversion of the input device dependent data signals with the calorimetric converting unit at the input end 22 are reproduced optimally on the output medium are set automatically so that the calorimetric conversion data determined in the calorimetric converting unit at the input end 22 are converted to an as-set up form. As shown in FIG. 1, the set-up unit 24 comprises a conversion-to/from-END section 30 in which the XYZ data signals obtained by the conversion in the calorimetric converting unit at the input end 22 are converted to equivalent neutral densities (hereinafter sometimes abbreviated as END) and vice versa, a rough data creating section 32 for reducing the END data signals to create rough data, and an auto set-up section 34 for setting up the gradation conditions automatically using the created rough data.

In FIG. 1, the path flows indicated by dashed lines are such that image-associated set-up parameters are set and used to construct a converting function or a look-up table (LUT) for converting the gradations. The path flows indicated by solid lines are for performing the main processing such that the calorimetric conversion data determined in the colorimetric converting unit at the input end 22 are converted to an as-set up form using the constructed converting function or LUT.

The procedure to be taken by the illustrated set-up unit 24 is as follows. First, in the conversion-to/from-END section 30, the XYZ data signals outputted from the colorimetric converting unit at the input end 22 are converted to equivalent neutral densities (END) by means of a conversion-to-/from-END matrix; then, in the rough data creating section 32, a portion of the END data obtained in the conversion-to/from-END section 30 is "thrown out" to produce rough data which consists of 106×83 (=9298) pixels when the image in one scene consists of 1280×1000 pixels. The rough data creating section 32 has preferably the same configuration as a rough data creating section 14 to be described later.

Thereafter, the auto set-up section 34 employs as auto set-up procedure to set automatically the highlight (HL) density (minimal value) aid the shadow (SD) density (maximal value) in the rough END data and these densities are set to the minimal value DH and the maximal value DS, respectively, of the dynamic range of the output medium (for example, to ensure that the density range of the film original which may be underexposed or overexposed is always adjusted to the density range of the output medium) so as to create a converting function [or a conversion table (one-dimensional LUT)] that coverts the rough END data to one having the desired gradation settings.

The colorimetric conversion data obtained from the calorimetric converting unit at the input end 22 are converted to the END data in the conversion-to/from-END section 30 and processed by the converting function (or LUT) to create as-set up END data, which are subsequently converted to as-set up XYZ data signals in the conversion-to/from-END section 30 by means of a conversion-from-END matrix. Thus, the auto set-up procedure performed in the set-up unit 24 ends.

It should be noted that the method of setting up the image data automatically in the set-up unit 24 is by no means limited to the above-described case and, needless to say, any known automatic set-up techniques may be applied.

Referring now to the colorimetric converting unit at the output end 26, it is such that colorimetric data signals such as XYZ data signals that have been subjected to color space compression in the color gamut compressing unit 10 are converted to device-dependent data signals such as CMYK data signals 50 that they can be outputted as a reproduced image from the output device such as a proof printer or a printing press. In the illustrated calorimetric Converting unit at the output end 26, XYZ data signals are converted to CMYK data signals by means of a three-dimensional table (3D LUT) so that they can be outputted as a color proof from a proof printer or as printed matter from a printing press. In the case under consideration, two 3D tables are employed, one being an original scene hi-fi reproducing 3D LUT for outputting a reproduced image faithful to the original scene (object) and the other being a standard condition reproducing 3D LUT for outputting a reproduced image under standard conditions. However, these are not the sole case of the invention and other three-dimensional tables will be substituted.

As in the case of the calorimetric converting unit at the input end 22, the output device contemplated, as well as the data on calorimetric values, device-dependent data and the method of color transformation (which is by inverse mapping and any known techniques of inverse mapping will do) to be employed in the calorimetric converting unit at the output end 26 are by no means limited to the cases described above and any known versions may be applied. For example, the output device may be a photographic printer, a copier or a display apparatus such as a CRT. The device-dependent data may be CMY or RGB data.

The color gamut compressing unit 10 is the most characterizing part of the invention and it is used to implement the color transforming method of the invention.

As FIG. 2 shows, the color gamut compressing unit 10 comprises a two-way converting section 12 for converting asset up XYZ data signals to L*a*b* data signals and vice versa, a rough data creating section 14 for "throwing out" a portion of the L*a*b* data signals to create rough data, an image analyzing section 16 that analyzes the image of interest by means of the as-set up rough data and sets the color space to be subjected to color gamut compression and the degree of such compression, and a color space compressing portion 18 for compressing the thus set color space using the also set degree of compression. In FIG. 2, the path flow indicated by dashed lines refer to those paths for setting the parameters for image-associated color space compression, namely, the color space to be subjected to color gamut compression and the degree of such compression; in short, they are the path flows for the preliminary processing that is performed prior to the compression of the color space. The path flows indicated by solid lines refer to those image processing paths for performing color space compression on the as-set up calorimetric conversion data using the preliminarily set parameters for the color space compression; in short, they are the path flow for the main processing in which the image data of interest is compressed.

Since the color space to be compressed by the method of the invention is assumed to be an L*a*b* space, the two-way converting section 12 converts the colorimetric XYZ data to L*a*b* data at the input end and converts the L*a*b* data to XYZ data at the output end. Calculations for the two-way conversion of the XYZ data to the L*a*b* data and vice versa are effected by the following equations:

$$L^* = 116(Y/Y_n)^{1/3} - 16 \quad Y/Y_n > 0.008856 \qquad (1)$$

$$a^* = 500[(X/X_n)^{1/3} - (Y/Y_n)^{1/3}] X/X_n > 0.008856$$

$$b^* = 200[(Y/Y_n)^{1/3} - (Z/Z_n)^{1/3}] Y/Y_n > 0.008856$$

$$Z/Z_n > 0.008856 \qquad (2)$$

where
  L*: the psychometric lightness in the L*a*b* color system;
  a*b*: the psychometric chromaticness in the L*a*b* color system;
  X, Y, Z: the tristrimulus values in the XYZ system provided that when $Y/Y_n$ is 0.008856 or less, L* is determined by the following equation:

$$L^*: 903.29(Y/Y_n) \qquad (3)$$

also provided that if $X/X_n$, $Y/Y_n$ or $Z/Z_n$ takes a value of 0.008856 or less, the corresponding term of a cubic root in equation (2) is replaced by 7.787 $(X/X_n)+16/116$, $7.787(Y/Y_n)+16/116$ or $7.787(Z/Z_n)+16/116$.

The rough data creating section 14 "throws out" a portion of the L*a*b* data from the two-way converting section 12 to create rough data of an appropriate volume to allow for the performance of image analysis in the image analyzing section 16 at the subsequent stage. The percentage (or volume) of the portion to be "thrown out" and the volume of the rough data to be created are not limited in any particular way and they may be selected as appropriate for the volume of the image to be processed and the required precision in processing.

For simplified processing, the rough data to be created in the illustrated color gamut compressing unit 10 has desirably the same pixel size as the rough data which is created for performing the auto set-up procedure in the set-up unit 24. Typically, the pixels of the image in one scene are reduced to one sixth in both vertical and horizontal directions, averaged within 2×2 pixels and finally reduced by one half in both vertical and horizontal directions. If the image in one scene consists of 1280×1000 pixels, the above procedure gives rough data consisting of 106×83 (=9298) pixels. The averaging step interposed in the reduction ("throwing-out or thinning-out") process is for noise reduction; however, this is not the sole case of the invention and any other procedure may be taken to create any kind of rough data.

The image analyzing section 16 is such that the pixels outside the color gamut of the output device are extracted from the as-set up rough data that has been created in the rough data creating section 14 and the extracted pixels are analyzed for the status of their distribution in the color space of interest so as to determine both the color space to be subjected to color gamut compression and the degree of such compression.

Since the color processing system shown in FIG. 1 is intended for reproducing printed matter, the first job to be done in the image analyzing section 16 is to determine whether the L*a*b* data (rough data) for the pixels of the image in one scene are within or outside the color gamut of the output device (i.e., printed matter) and then extract the pixels outside the color gamut. The result of the determination as to whether the pixels in one scene are outside the color gamut to be reproduced by the printed matter (which is hereinafter simply referred to as "outside the color gamut") can be verified by first converting the L*a*b* data (rough data) to XYZ data in the two-way converting section 12 and then converting the XYZ data to CMYK data (i.e., output device data) in the calorimetric converting unit at the output end 26 (see FIG. 1) using a color transforming table at the output end (e.g. 3D LUT)

In the next step, hue Hab* ranges are extracted from the thus obtained pixels outside the color gamut of the printed matter. Firstly, the L*a*b* data for the pixels outside the color gamut of the printed matter is subjected to calculation of hue Hab* (in the angular direction of polar coordinates in the a*b* plane of the L*a*b* space) so as to construct a hue Hab* histogram, which is then subjected to smoothing by a 1:2:1 shift averaging technique. An example of the thus obtained hue Hab* histogram (0°–360°) is shown in FIG. 3A. Smoothing by a shift averaging technique is necessary to construct the hue Hab* histogram. A simple hue histogram of the pixels outside the color gamut of the printed matter does not provide as smooth a curve as shown in FIG. 3A but provides a curve that contains many "jaggies" due to high-frequency components; in the presence of such undulations, the subsequent step of cutting off by a threshold will produce offsets or inversion of hue ranges and the result is by no means correct. The ratio of shift averaging is not limited to 1:2:1 and may be replaced by other ratios which can be appropriately selected from known ones.

The thus obtained hue Hab* histogram of the pixels outside the color gamut of the printed matter is cut off by reference to a threshold for the frequency value so as to extract hue Hab* ranges from the pixels outside the color gamut of the printed matter. In the case under consideration, a threshold (pixel frequency) of 40 is applied to the hue Hab* histogram shown in FIG. 3A and $H_1$–$H_2$ and $H_3$–$H_4$ are extracted as hue ranges above the frequency of 40 (see FIG. 3B). It should be noted that the threshold of 40 is only applicable to the illustrated case where the rough data consists of 8298 pixels and it is by no means the sole case of the invention; appropriate values may be set in accordance with various factors including the volume of the rough data (the number of pixels it contains), the type and size of the image to be reproduced, the volume and precision (gradations) of the data that can be handled by the input and output devices, and the required quality of the reproduced image.

Figure 4:
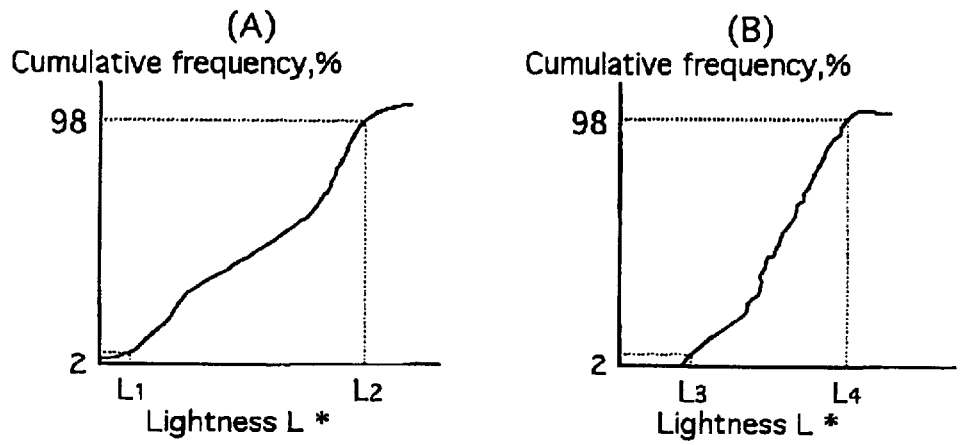
FIG. 4A is a graph showing a lightness L* cumulative histogram corresponding to a hue range for the group of pixels outside the color gamut of interest which are shown in FIG. 3B.
FIG. 4B is a graph showing a lightness L* cumulative histogram corresponding to another hue range for the group of pixels outside the color gamut of interest which are shown in FIG. 3B.

Subsequently, a lightness L* cumulative histogram is constructed for the group of pixels within each of the hue Hab* ranges of the pixels outside the color gamut of the printed matter. Thus, lightness L* ranges are extracted from the group of pixels outside the color gamut of the printed matter. FIG. 4A shows the lightness L* cumulative histogram constructed for all the pixels within the hue Hab* range $H_1$–$H_2$ th a has been extracted by the threshold 40 from the hue Hab* histogram shown in FIG. 3B, and FIG. 4B shows the lightness L* cumulative histogram constructed for all the pixels within the hue Hab* range $H_3$–$H_4$ also extracted from the same hue Hab* histogram.

From the thus obtained lightness L* Cumulative histograms shown in FIGS. 4A and 4B which correspond to the hue ranges $H_1$–$H_2$ and $H_3$–$H_4$, respectively, the ranges of the cumulative frequency of 2% at the higher and lower ends are cut off to extract lightness L* ranges $L_1$–$L_2$ and $L_3$–$L_4$ which are within the cumulative frequency ranges of 2–98%. Cumulative histograms are constructed for lightness L* because they allow for the extraction of stabler ranges of lightness L* than simple histograms.

Herein, the cumulative frequency range of 2% is cut off at the higher and lower ends to determine the range of lightness L* of the group of pixels outside the color gamut of the printed matter and this is in order to produce only the group of pixels having appropriate lightness by eliminating those pixels which have potentially noisy levels of lightness L* or extreme (too bright or too dark) levels of lightness L*. In the illustrated case, the cumulative frequency portions of 2% at the higher and lower ends are cut off but this is not the sole case of the invention and the cutoff cumulative frequency may be selected as appropriate for various factors including the type and size of the image to be reproduced, as well as the gradations and image quality that are required.

Turning back to the group of pixels in each of the previously determined hue Hab* ranges of the pixels outside the color gamut of the printed matter, the values on the boundary of the color gamut in the direction of chroma Cab* in the a*b* plane of the L*a*b* space (i.e., in the radial direction of the polar coordinates in the a*b* plane) are normalized to unity and a cumulative histogram is constructed that represents the proportion of values outside the color gamut, or those which exceed 1.0 (the proportion shows how many pixels are outside the color gamut of interest") and the percentage of color space compression is determined from the resulting normalized chroma Cab* cumulative histograms that correspond to the respective hue Hab* ranges (and which represent the cumulative frequencies of the pixels having normalized chroma Cab* values outside the color gamut to be reproduced).

Figure 5:
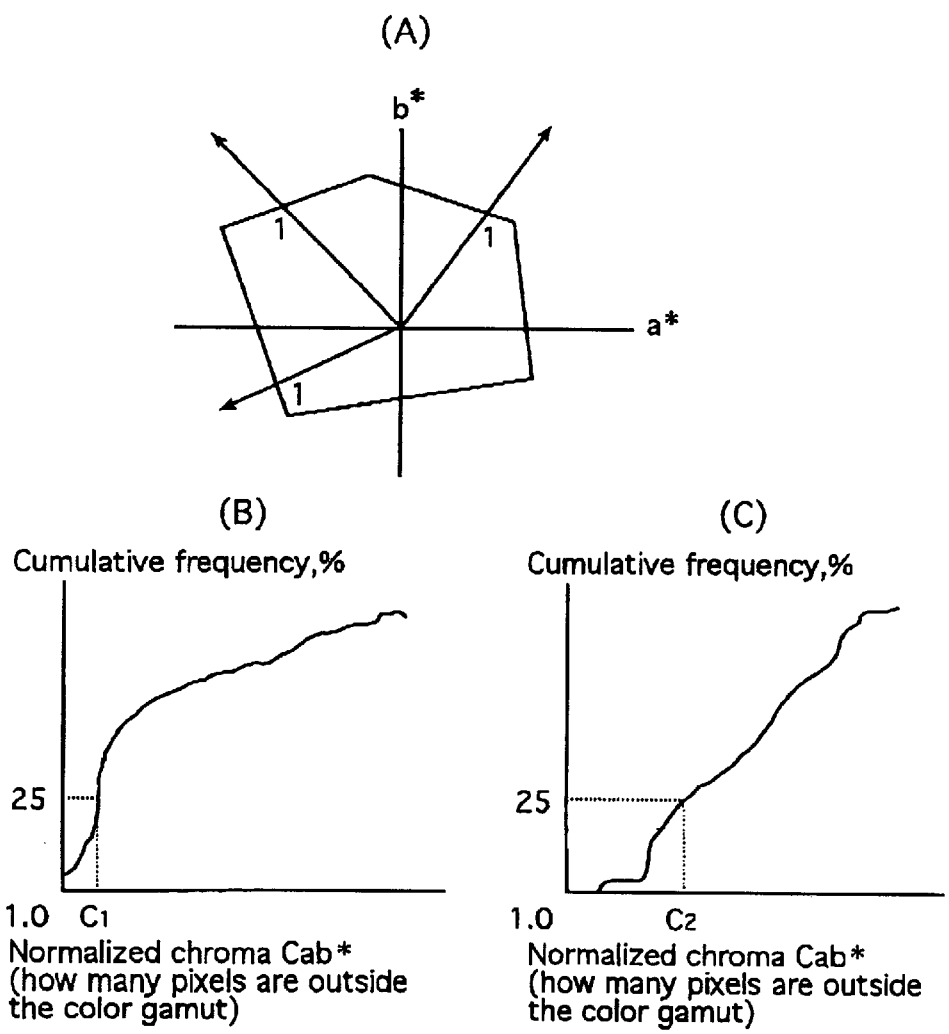
FIG. 5A illustrates how the boundary of a color gamut of interest in the direction of chroma is normalized to unity against the group of pixels in each of the hue ranges for the group of pixels outside the color gamut of interest.
FIG. 5B is a graph showing a normalized chroma Cab* cumulative histogram corresponding to a hue range for the group of pixels outside the color gamut of interest which are shown in FIG. 3B.
FIG. 5C is a graph showing a normalized chroma Cab* cumulative histogram corresponding to another hue range for the group of pixels outside the color gamut of interest which are shown in FIG. 3B.

A parameter for determining the percentage of compression may be preset by the following procedure. FIGS. 5B and 5C show normalized chroma Cab* cumulative histograms that correspond to the hue Hab* ranges $H_1$–$H_2$ and $H_3$–$H_4$, respectively, that are shown in FIG. 3B. In those normalized chroma Cab* cumulative histograms, the values of normalized chroma Cab* that are outside the color gamut and which correspond to the cumulative frequency of 25% are determined and set as $C_1$ and $C_2$ (see FIGS. 5B and 5C). The cumulative frequency 25% is not the only value that can be used as a threshold in the present invention and other values may be selected as appropriate for various factors including the type and size of the image to be reproduced, as well as the gradations, precision and image quality required.

This is how the parameter for determining the percentage of compression is set in terms of normalized chroma value $C_i$ (i=1, 2, ...) where i is the number assigned to the group of pixels within a specific hue range for the group of pixels outside the color gamut to be reproduced. In the illustrated case, "1" is assigned to the hue range $H_1$–$H_2$ and "2" to the hue range $H_3$–$H_4$.

Using the thus obtained normalized chroma value $C_i$ (i=1, 2, ...), one can determine the percentage of compression Cpi by the following equation (4):

$$Cpi = Ci - 1.0 \qquad (4)$$

The percentage of compression Cpi may be varied in accordance with the size of the output image. In this case, Cpi can be determined by the following equation (5) which is a generalized form of equation (4):

$$Cpi = k(Ci-1.0) \tag{5}$$

where k is a coefficient dependent on the size of the output image.

The reason for including the size of the output image as a factor in the percentage of compression is as follows: if the size of the output image is large, the presence or absence of gradations in high-chroma colors is clearly visible to make the reproduced image quite unnatural but this is not the case if the size of the output image is small.

The percentage of compression Cpi expressed by equation (4) or (5) is preferably maximal at 0.3. If Cpi is unduly greater than 0.3, the chroma of the color gamut is so low that the image looks quite unnatural with very dull colors. Therefore, in the present invention, the cumulative frequency values that determine the normalized chroma value Ci which is a Cpi determining parameter may be selected as appropriate for various factors including the type and size of the image (scene) to be reproduced, as well as the gradations, precision and the image quality required.

The next step is to determine the range of the color space to be compressed on the basis of the parameters for the color space which is to be subjected to the compression of color gamut. Briefly, by use of the parameters for the color space which is to be subjected to the compression of color gamut such as the hue ranges $H_1$–$H_2$ and $H_3$–$H_4$ and the lightness ranges $L_1$–$L_2$ and $L_3$–$L_4$ for the pixels outside the color gamut, the intensity Ti of the color space to be subjected to the compression of color gamut that can maintain continuity with neighboring color spaces (Ti is hereinafter referred to simply as the "intensity of color space compression") is determined for each of the pixel groups i in the respective hue ranges.

FIG. 6 shows an example of the intensity of color space compression Ti in the hue Hab* range $H_1$–$H_2$ and the corresponding lightness L* range $L_1$–$L_2$. As shown, Ti is set at 1.0 within the rectangle bounded by the hue range $H_1$–$H_2$ and the lightness range $L_1$–$L_2$, both of which have been extracted to represent the pixels outside the color gamut to be reproduced; the rectangular zone is then extended outwardly in both the hue and lightness directions to specified limits which, in the illustrated case, are ±20° in the hue direction and ±20 in the lightness direction; in the zone outside the expanded rectangular zone which extends from $H_1$–20 to $H_2$+20 in the hue range and from $L_1$–20 to $L_2$+20 in the lightness range and on the border lines of the expanded rectangular zone, Ti is set at 0.0; in the color space of the range bounded by the two rectangles, Ti is set to vary continuously from 0.0 to 1.0. Similarly, the intensity of color space compression can be set for the hue Hab* range $H_3$–$H_4$ and the lightness L* range $L_3$–$L_4$.

By setting the intensity of color space compression Ti n the way described just above, continuity can be maintained between the color space to be subjected to the compression of color gamut and the neighboring spaces which are not to be subjected to the compression. In the case illustrated in FIG. 6, the limits of expansion within which the intensity of color space compression Ti is to be varied from 0 to 1.0 are set at ±20° for the hue range and at ±20 for the lightness range. This is not the sole case of the invention and appropriate values that will ensure smooth continuity to neighboring color spaces may be selected in accordance with various factors including the sizes of the hue and lightness ranges for the pixels outside the color gamut of interest, the type and size of the image (scene) to be reproduced, as well as the gradations, precision and the required image quality.

Using the thus determined intensity Ti of the color space to be subjected to the compression of color gamut and the previously determined percentage of compression Cpi, the color space compressing section 18 uses the as-set up calorimetric conversion data to compress the color space for each of the hue ranges i that are outside the color gamut to be reproduced. In this step, for each hue range i, the chroma Cab* is linearly compressed using the product of Ti and Cpi in accordance with the following equation (6). Similarly, the lightness L* is linearly compressed for each hue range i, except that the following equation (7) is applicable in such a way that the product of Ti and Cpi is dependent on the lightness L* and the chroma Cab*. On the other hand, the hue Hab* is invariable and held constant.

$$Cab^{*\prime} = Cab^*(1.0 - CpiTi) \tag{6}$$

$$L^{*\prime} = L^* - (1.0 - CpiTi)LciCci \tag{7}$$

where Cab*' and L*' represent the chroma and lightness after the compression of the color space; Cab* and L* are the chroma and lightness before the compression; and Cci and Lci are functions dependent on the chroma Cab* and lightness L*, respectively.

FIG. 7A shows an example of the lightness L* dependent function Lci which is to be used in the invention, and FIG. 7B shows an example of the chroma Cab* dependent function Cci which is also to be used in the invention. Referring to the lightness L* dependent function Lci shown in FIG. 7A, lightness L*=90 is a constant for the density of the paper to be used in printing and L*=10 represents the maximum ink density to be adopted in printing. Referring to the chroma Cab* dependent function Cci shown in FIG. 7B, chroma Cab*=50 which is saturated at a function value Cci=1.0 represents the maximal chroma value in the color gamut to be reproduced in printed matter.

Figure 8:
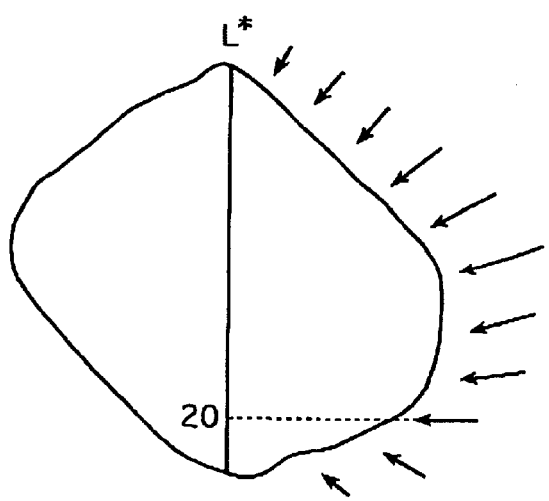
FIG. 8 illustrates how color space compression is done by the color transforming method of the invention.
Figure 9:
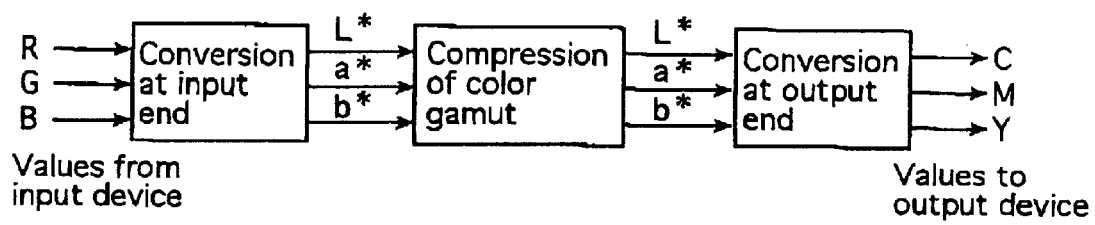
FIG. 9 is a block diagram for a color processing system adapted to perform color management.

The lightness dependent function Lci and the chroma dependent function Cci which are shown in FIGS. 7A and 7B, as well as the constants to be used with these functions (i.e., lightness L*=10, 90; function value Lci=15; chroma Cab*=50) are not the sole examples that may be employed in the present invention and other examples may be selected as appropriate for various factors including the input and output devices in the color processing system to which the color transforming method of the invention is to be applied, the input and out media to be used, the type and size of the image to be reproduced, as well as the gradations, precision and image quality that are required. The stated functions need not be linear and may be replaced by nonlinear functions; if desired, the associated constants may be varied in a manner dependent on hue Hab*. FIG. 8 shows schematically how the color space of interest is compressed using the lightness dependent function Lci and the chroma dependent function Cci which are shown in FIGS. 7A and 7B, respectively. It should be understood that the color space is compressed in the chroma direction in proportion to the degree of compression whereas it is compressed in the lightness direction in a manner dependent upon lightness and chroma.

Thus, mathematical operations for color space compression are performed in the color space compressing section 18; specifically, they are intended to calculate the lightness L*' and chroma Cab*' after color space compression. The as-set up calorimetric conversion data (L*a*b data) for all the pixels that have been obtained by conversion in the two-way converting section 12 are subjected to calculations by equations (6) and (7) for the pixels within the hue ranges of the pixels outside the color gamut to be reproduced (i.e., for the pixels in the color space to be subjected to the compression of the color space of interest), thereby yielding image data that has been subjected to color space compression and which is then restored to XYZ data in the two-way converting section 12.

In the illustrated case, the extracted hue ranges of the pixels outside the color gamut to be reproduced are all subjected to color space compression by the method of the invention; if desired only the pixels of specific hues that are selected from those within several hue ranges or, alternatively, groups of pixels that are located in different positions in the same hue range may or may not be compressed in response to an external command or an entry from the keyboard. Needless to say, appropriate hue ranges or hue, chroma and lightness ranges may be preliminarily designated such that automatic selection can be made between "compressing" and "not compressing".

Another feature of the illustrated case of compressing the color space is that specific hue Hab* ranges are extracted from the pixels outside the color gamut to be reproduced and only those hue ranges are subjected to color space compression but the hue Hab* itself is invariable and held constant. However, this is not the sole case of the invention and it may be adapted to vary not only the lightness and chroma but also the hue. If this is to be done, the hue is preferably varied to that of the coloring material in the output device.

While the color transforming method of the invention has been described above in detail and specifically with reference to various embodiments, it should be noted that they are not the sole case of the invention and various improvements and adaptations can of course be made without departing from the scope and spirit of the invention.

As described above in detail, the color transforming method of the invention is applied in such a way that only the color hues of the pixels located outside the color gamut of the output medium and, hence, the color gamut to be reproduced (i.e., the color space of interest) can be compressed without affecting the color reproduction of pixels of other hues. Therefore, according to the invention, color gradations comparable to those of originals (e.g. objects and original images) or input image can be reproduced with minimum compromise in the fidelity of calorimetric reproduction and yet maintaining satisfactory continuity with neighboring pixels.

What is claimed is:

1. A color transforming method comprising the steps of:
   performing calorimetric conversion on image data obtained from an input medium to produce calorimetric data on an image to be reproduced;
   creating rough data from a portion of the converted calorimetric data by extracting image data from all the image data of said image, and averaging the extracted image data for spatially throwing out a portion of the input image data; and
   analyzing the rough data to determine automatically a format for compressing an input space of said image to an output space, wherein said analyzing step determines a portion of a color space to be compressed.

2. The color transforming method according to claim 1, wherein a degree of compression is varied depending upon a size of the image to be outputted.

3. The color transforming method according to claim 1, wherein said color space to be compressed and a degree of compression are first determined and then said color space to be compressed is compressed in a manner dependent on the determined degree of compression.

4. The color transforming method according to claim 3, wherein said color space to be compressed and the degree of compression are determined from hue, lightness and chroma histograms of pixels located outside a color gamut to be reproduced by an output medium.

5. The color transforming method according to claim 1, wherein the compression of the portion of said color space to be compressed is performed by compressing the chroma in proportion to a degree of compression and the lightness in a manner dependent on said degree of compression, lightness and chroma while keeping the hue constant.

6. The color transforming method according to claim 1, wherein the compression of the portion of said color space to be compressed is performed by compressing the chroma in proportion to a degree of compression and the lightness in a manner dependent on said degree of compression, lightness and chroma as the hue is varied to that of the coloring material in the output medium.

7. The color transforming method according to claim 1, wherein said rough data on the image is obtained from as-set up image data.

8. The color transforming method according to claim 1, wherein said pixels located outside the color gamut to be reproduced by the output medium are identified by means of a conversion table at the output end that converts the calorimetric data to image data dependent on the output medium.

\* \* \* \* \*